Feb. 14, 1933. C. METZ 1,897,852
BAIL EAR
Filed Aug. 16, 1932
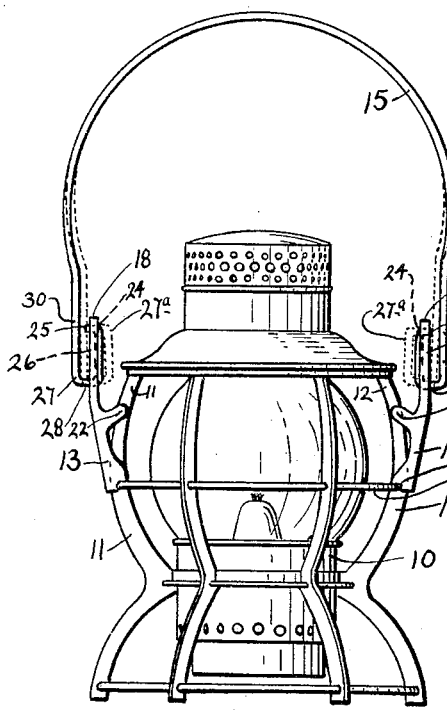
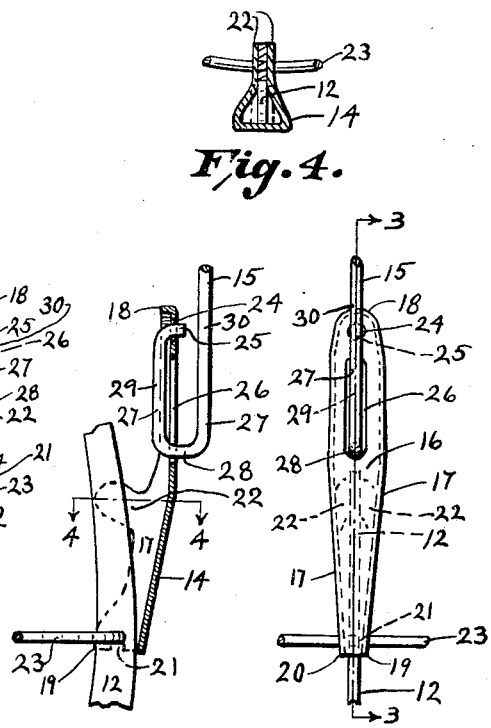
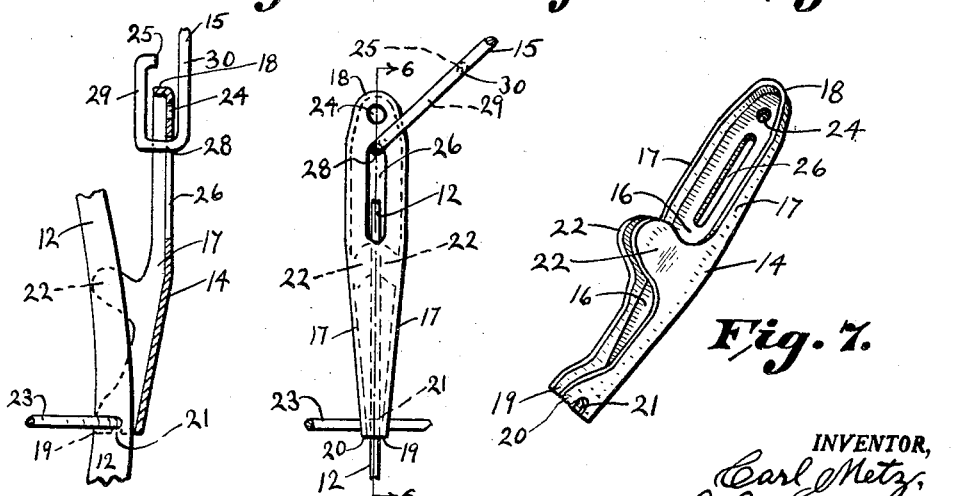

Patented Feb. 14, 1933

1,897,852

UNITED STATES PATENT OFFICE

CARL METZ, OF PHILADELPHIA, PENNSYLVANIA, ASSIGNOR TO KEYSTONE LANTERN COMPANY, OF PHILADELPHIA, PENNSYLVANIA, A CORPORATION OF NEW JERSEY

BAIL EAR

Application filed August 16, 1932. Serial No. 629,029.

This invention relates to bail ears, particularly those used on lanterns.

The main object of my invention is to provide a combined form of bail ear and connecting bail end construction, which will be easily and quickly changeable from an interlocked position, to an unlocked and movable position, and vice versa, while the parts remain attached; and further to have the bail stand up by itself, for the interlocked position, and remain there, rigidly fixed, when carried and supporting the thing to which the bail ear is attached, whether that thing be a lantern, a kettle, a pot, or pan or anything else.

For use in connection with a railway lantern, my object is to provide a combined bail ear and bail end construction, permitting the quick and easy locking of these parts together, so that such locking can be depended upon to remain fixed, when the lantern is swung by hand, for signal purposes, where it is required that the bail be held axially rigid, with respect to the lantern itself. But, when it is desired to free the bail from such a locked position on the ear, so as to be turned down and left to rest against the lantern, I desire to have the construction such as can be released from its locked position, by a simple, horizontal, squeezing pressure in the plane of the bail and between the hands of one holding the bail at opposite parts, which are a little above its attachments to the bail ears, using the same pressure operation, when positioning the bail ear and bail end parts for locking engagement, where the bail ends spring further apart for engagement with the bail ears upon being released from the said squeezing pressure.

With these and other objects, which will appear in connection with the following description, my invention resides in certain construction, one embodiment of which is illustrated in the drawing and is hereinafter described. The use and adaptation of the construction is explained and what I claim is set forth.

In the drawing,

Figure 1 is an elevation of a lantern having parts embodying my invention.

Figure 2 is an end elevation showing one of the bail ears in locked position with a bail end.

Figure 3 is a section taken on the line 3—3, of Figure 2.

Figure 4 is a section taken on the line 4—4, of Figure 3.

Figure 5 is an end elevation showing one of the bail ears in unlocked position with a bail end.

Figure 6 is a section taken on the line 6—6 of Figure 5.

Figure 7 is a perspective view of the bail ear per se, shown in the other illustrations.

In the figures, 10 is a form of railway lantern having upright cage members 11 and 12, disposed diametrically opposite to one another. Fixed to the cage member 11, is the bail ear member 13, and fixed to the cage member 12, is the bail ear member 14. In the figures, the bail ear members are alike. Engaging the bail ear members is a bail 15. Considering the formation of the bail ear member 14, the body 16, thereof, has a surrounding flange portion 17, with a curved end 18, and free ends 19 and 20, notched below at 21. Projecting midway from the sides of the flange portion 17, are arms 22, which are bent toward one another, so as to bear against the cage member 12, held therebetween, and shown in Figure 1, to be soldered, or otherwise fixed to the member 12. The notch 21 is shown engaging the guard ring wire 23, of the cage. The bail ear member 14, thus makes a rigid extension to the upright cage member 12. Referring again to Figure 7, there is shown a hole 24, in the body 16, of the member 14, within its curved end 18. This hole 24 is of a size adapted to loosely engage an end 25, of the bail 15. Below the hole 24, is a slot 26, positioned centrally and longitudinally through the body 16, of the bail ear member 14. The part of the member 14, containing the slot 26, is bent with respect to the lower part of the body 16, so as to have the slotted part of the member 14, stand parallel with respect to axis of the lantern. In Figure 1, the bail 15 is shown to terminate in similarly formed ends, bent to form a hook 27, having a lower portion 28, and a free, upright portion 29, having its upper part bent terminating in the end 25, which is adapted to engage the hole 24, of the bail ear member. The end 25 is spaced from the shank part 30, of the bail 15, so as to readily pass by the flange portion 17, of the member 14, in the operation of locking or unlocking the parts.

For the construction illustrated in Figure 1, the bail 15 is in a normal spring pressing condition, tending to spread the bail ends.

In use, considering the full line position of the parts, as shown in Figure 1, the terminal parts 25, of the bail 15, pointing outward, are illustrated engaging the holes 24, while the lower portions 28, of the hook 27, engage the lower part of the slots 26. The spring action of the bail 15, normally tending to force the hooks further apart, secures the end 25 in releasably, fixed engagement with the respective holes 24, while the sides of the slot 26, engaging the portion 28, prevent the turning of the hook ends 25 within the holes 24 and securely fix the bail 15 in a rigid upright position even against unlocking, when the bail 15 is held by hand supporting the lantern. Figures 2, 3 and 4 particularly illustrate the locked engagement of the hook 27 with the bail ear 14.

In order to release the locked engagement of the bail ends with their respective bail ears, a squeezing pressure is brought to bear upon parts of the bail 15, just above the bail ear members 13 and 14, having such pressure exerted in the plane of the bail 15, so as to bring the hooks 27 into the released dotted position 27a shown in Figure 1, and while still released, by the said pressure, having the ends 25 disengaged from the respective holes 24, the bail 15 is lifted, so that the ends 25 pass above the curved ends 18, of the bail ears, while the hook portions 28, pass up in the slots 26. With the hooks 27, of the bail 15, thus released from locking engagement with the respective ear members, 13 and 14, the bail 15 will turn upon its portion 28, engaging the slot 26, as shown in Figures 5 and 6, and the bail 15 is thus free to fall and rest against the lower part of the lantern cage.

If desired, only one set of the bail ear and bail end may be made in accordance with the releasable locking construction of my invention with the other end of the bail attached in the ordinary way to a bail ear, so that the bail end and ear which form such locking parts, will serve on one side alone to hold the bail 15 upright, with respect to the lantern, while at the same time being releasable from this locked position. But, I prefer to have both ears and the co-ordinating bail ends made in accordance with my invention, for additional security, when locked.

In Figure 1, the hooks 27 are shown in spring-pressed engagement with the holes 24, by reason that the bail 15 is formed of a kind of spring wire, in a shape to have the hook ends 25, normally spring-pressed outward, when these ends are in engagement with the holes 24. If the formation of the hooks 27 is reversed, to have the ends 25 point inward and the bail 15 is formed to have the hooks spring-pressed inward, for engagement with the holes 24, then instead of using a squeezing pressure to release the hook ends 25, from the holes 24, or to position these ends for engagement with the holes, upon the release of such pressure, for such a reversed formation, the lower parts of the bail 15, just above the bail ears, would be taken hold of by a person's hands and a pull, as between the parts of the bail so held, would be exerted for the locking and unlocking operation. However, I prefer to form the bail 15 and its hooks 27, as shown in Figure 1, having the parts adapted to be operated a squeezing, rather than a pulling force.

It will be observed that the particular formation of the bail ear member, per se, as shown and described and particularly illustrated in perspective, in Figure 7, lends itself easily to stamping operations, in manufacture, forming the bail ear member from sheet metal, to be stiff while being easily and quickly attached to an upright cage member.

While I have shown and described a bail ear construction as applied to lanterns, it is evident that ears and bails of such construction may be attached to anything else as a pot, a pan or a kettle, serving the purpose of a releasable, interlocking relation between the bail ear and the bail.

Inasmuch as changes can be made in the form of my invention herewith illustrated and described, without departing from the spirit and scope thereof, I wish to include all forms which come within the purview of the following claims.

I claim:

1. A spring-pressed and releasably locking connection between a bail and an object attached to swing on the ends of said bail, said connection comprising a bail ear on said object, said bail ear having a hole and a slot in it, said slot having some portions thereof further from said hole than other portions thereof, a hook connected with said bail, passing through said slot to have a portion of said hook engage the sides of said slot, said hole being positioned in relation to the end of said hook, to be engaged by the said end during the engagement of said hook with said slot, and means affording a spring pressure on said hook, adapted to releasably hold said hook end engaged with said hole.

2. A spring-pressed and releasably locking connection between an elastic bail and an object attached to swing on the ends of said bail, in a spring-pressed relation, exerted by said bail, in the line between the bail ends, said connection comprising a bail ear on said object, said bail ear having a slot through it, positioned up and down in relation to said object, and a hook on said bail, passing through said slot, there being a hole in said bail ear, spaced from said slot, adapted to be releasably engaged by the end of said hook, during the engagement of said hook with said slot, said hook being held, when engaging said hole, by means of the spring pressing action of said bail, exerted in a direction across the said bail ear.

3. A bail and an object attached thereto, adapted to swing on said bail, and having in combination thereof, a spring-pressed and releasably locking connection between each end of said bail and said object, each of said connections comprising a bail ear on said object, said bail ear having a hole and a slot in it, said slot having some portions thereof further from said hole than other portions thereof, a hook connected with said bail, passing through said slot, to have a portion of said hook engage the sides of said slot, said hole being positioned in relation to the end of said hook, to be engaged by the said end during the engagement of said hook with said slot, and means affording a spring pressure on said hook adapted to releasably hold said hook end engaged with said hole.

4. A lantern with a bail, a cage, an upright cage member, and a guard ring connected with said cage member, said lantern and bail having in combination thereof, a spring-pressed and releasably locking connection between one end of said bail and said lantern, said connection comprising a bail ear having a slender body, arms on said body, between its ends, embracing and fixed to said upright cage member, and having the lower end of said body in notched engagement with said guard ring at its connection with said upright cage member, the upper portion of said bail ear body having an upright slot therethrough, with a hole above and spaced from said slot, a hook on said bail, passing through said slot to have a portion of said hook engage the sides of said slot, said hook being formed to have its end engage said hole, when said hook engages the lower part of said slot, for locking said bail in an upright position on said bail ear, and means affording a spring pressure on said hook, adapted to releasably hold said hook end engaged with said hole.

5. In a lantern having attached thereto a bail with hooks, upon which said lantern swings, a bail ear attached to said lantern and connected with said bail, comprising a body having a longitudinal slot therethrough, and a hole spaced from said slot, said slot and said hole being positioned for engagement with one of said hooks, to have the end of said hook engage said hole, during the engagement of a portion of said hook with said slot.

CARL METZ.